(12) United States Patent
Pasquer et al.

(10) Patent No.: US 7,165,743 B2
(45) Date of Patent: Jan. 23, 2007

(54) FRONT FASTENING DEVICE FOR AIRCRAFT ENGINE

(75) Inventors: Felix Pasquer, Lieusaint (FR); Philippe Loewenstein, Saint Arnoult le Bourg (FR); Marc Tesniere, Champcueil (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/843,306

(22) Filed: May 12, 2004

(65) Prior Publication Data
US 2004/0251381 A1 Dec. 16, 2004

(30) Foreign Application Priority Data
May 27, 2003 (FR) ................................. 03 06436

(51) Int. Cl.
*B64D 27/00* (2006.01)
(52) U.S. Cl. ........................................... 244/54; 60/797
(58) Field of Classification Search ............... 244/53 R, 244/54, 55, 58, 60, 131, 554; 60/797, 796
See application file for complete search history.

(56) References Cited

U.S. PATENT DOCUMENTS

| | | | | |
|---|---|---|---|---|
| 5,275,357 A | * | 1/1994 | Seelen et al. ................. | 244/54 |
| 5,303,880 A | * | 4/1994 | Cencula et al. ................ | 244/54 |
| 5,351,930 A | * | 10/1994 | Gwinn et al. ................. | 244/54 |
| 5,620,154 A | * | 4/1997 | Hey ............................. | 244/54 |
| 5,649,417 A | * | 7/1997 | Hey ............................. | 244/54 |
| 5,860,623 A | * | 1/1999 | Dunstan et al. ............... | 244/54 |
| 6,330,995 B1 | * | 12/2001 | Mangeiga et al. ........... | 248/554 |
| 6,682,015 B1 | * | 1/2004 | Levert et al. .................. | 244/54 |

FOREIGN PATENT DOCUMENTS

| EP | 0 564 126 | 10/1993 |
|---|---|---|
| EP | 0 741 074 | 11/1996 |
| EP | 0 744 338 | 11/1996 |
| EP | 1 031 507 | 8/2000 |

* cited by examiner

Primary Examiner—Timothy D. Collins
(74) Attorney, Agent, or Firm—Oblon, Spivak, McClelland, Maier & Neustadt, P.C.

(57) ABSTRACT

A front attachment device for attaching an aircraft engine to an aircraft pylon includes an upper brace fitted with elements rigidly fastened to the pylon and first and a second connecting rods, each connected to the engine, via a first ball joint connection at one end portion and to the upper brace via a second ball joint connection on the other end portion. The device further includes in each connecting rod a third stand-by link. The first and second connecting rods are interchangeable with each other.

14 Claims, 4 Drawing Sheets

FRONT FASTENING DEVICE FOR AIRCRAFT ENGINE

This invention relates to the suspension of propulsion engines to an aircraft structure. It relates in particular to a suspension or fastening device including means for retaining the suspension in case of accidental breakage of one of its parts.

A propulsion engine can be mounted at various places of an aircraft, for example suspended from a pylon integral with the structure thereof. It may be suspended under the wings, fastened to the fuselage or mounted in the tail unit by attachment means. The purpose of these attachment means is to ensure transmission of the mechanical loads between the engine and the aircraft structure. The loads to be taken into account are oriented along the three main directions. These are notably the weight of the engine, its thrust and the lateral aerodynamic loads. The loads to be transmitted also include the rotation torque around the axis of the engine. Besides, these means must absorb the deformations undergone by the engine during the various phases of the flight by reason notably of the dimensional variations due to thermal expansions or contractions.

A suspension mode, for example, in the case of a fan-type turbo engine, consists in fastening the engine to a pylon integral with the wing structure of the aircraft using a front suspension or attachment and rear suspension or attachment. The front suspension is fastened in particular to the outer casing of the fan and the rear suspension to the exhaust casing of the primary flux.

According to a configuration known, the front attachment is arranged to ensure transmission of the vertical and tangential loads between the engine and the aircraft. The rear attachment is arranged for letting through the mechanical loads along the same directions, as well as to enable transmission of the engine torque around the axis of the turbo engine and of the thrust. The latter is transmitted via two thrust recovery bars attached, at the front, to the base of the fan casing on both sides of the longitudinal axis and, at the rear, by means of the rear suspension of the engine.

The present invention relates to an attachment arranged for transmitting the vertical and lateral loads between the engine and the pylon of the aircraft. It is the front attachment configuration reminded above.

An attachment of such a type includes a so-called upper brace, integral with the aircraft pylon, a so-called lower brace integral with the engine casing and a set of connecting rods co-operating with said parts. By way of their lay-out, the connecting rods should enable transmission of the traction and compression loads along their axis.

The attachment devices also integrate, in case of failure of any part, safety means intended to prevent the engine from coming apart from the aircraft. For example, we know means, notably, composed of elements which remain inactive under normal operating conditions of the engine, when the parts of the attachment device are intact. If any part breaks, the safety means become active. These safety means take over from the faulty parts in the attachment device.

We know for example an attachment device, such as described in the patent U.S. Pat. No. 6,330,995, including a first connecting rod and a second connecting rod between both upper and lower braces. The first connecting rod is mounted using a ball joint connection to a lug of the engine, and using two distinct links to the upper brace whereof one is fitted with a ball joint, the other one is axial. The second connecting rod is associated with a lug of the engine via a ball joint connection and to the upper brace via a single ball joint connection under normal operation. A second connection is provided, but the connecting pin is mounted to its counterpart with a backlash. Under normal operation, this second joint remains therefore inactive. The device includes a third connecting rod, between both braces, which remains in stand-by also by the presence of backlashes between the connecting pin and their respective housing. Under normal operation, the loads are transmitted by the first of the connecting rods by reason of both its connecting points with the upper brace. The second connecting rod transmits the tension and contraction loads by reason of its assembly with a single joint.

If the second connecting rod breaks, both braces pivot with respect to one another around the first connecting rod in order to eliminate the initial backlashes on the third connecting rod. The latter becomes active and replaces the second connecting rod. If the first connecting rod breaks, the backlashes of the second connecting rod are eliminated as well as the backlash of the third link of the second connecting rod. There again, the suspension fulfils its function further without any alterations in its performances.

It may be observed that the first and second connecting rods are in the form of a boomerang and exhibit certain symmetry. They are, however, not interchangeable since one of the axes of the second connecting rod is mounted with a backlash whereas the three axes are active in the first.

This type of arrangement involves machining specific parts. Each connecting rod has a unique position in the suspension. There are therefore as many references as parts forming the attachment device. This does not imply optimum savings in manufacture and management.

Besides, both main connecting rods are quasi identical in shape. During assembly, the technician must adhere to very accurate operating mode and proceed with greatest care. The risk of mistakably assembling a part instead of another is not negligible.

The applicants have set themselves as a target to provide a device for attaching an engine to the aircraft structure, whereof the risks of error during assembly are reduced to a minimum.

They also aim at the realisation of a device including interchangeable parts. It would be therefore possible to perform the assembly with a smaller number of different parts. Not only would the risk of error be reduced, but also the costs of manufacture, maintenance and stock management of the parts.

The invention meets these targets with a device for attaching a turbo engine to an aircraft pylon including an upper brace fitted with rigid fastening means to the pylon, a first and a second connecting rods, each connected to the brace, via a first ball joint connection, on the one hand, and to the engine via a second ball joint connection, on the other hand, characterised in that each connecting rod includes a third stand-by link.

In particular, at least one of both stand-by links is provided as a ball joint connection with a pivot pin mounted with a backlash in its housing. Notably, each stand-by link is a ball joint connection with a longitudinal pivot pin mounted with a backlash in its housing, both backlashes being identical.

According to a first embodiment, the third stand-by connection links the connecting rod to the upper brace.

According to another embodiment, the third stand-by connection links the connecting rod to the engine.

Preferably, the first and second connecting rods are identical. In particular, the connecting rods are curved in shape, the three links forming an angle with respect to one another.

The invention will be understood better when reading the following description, with the appended drawings wherein.

Figure 1:
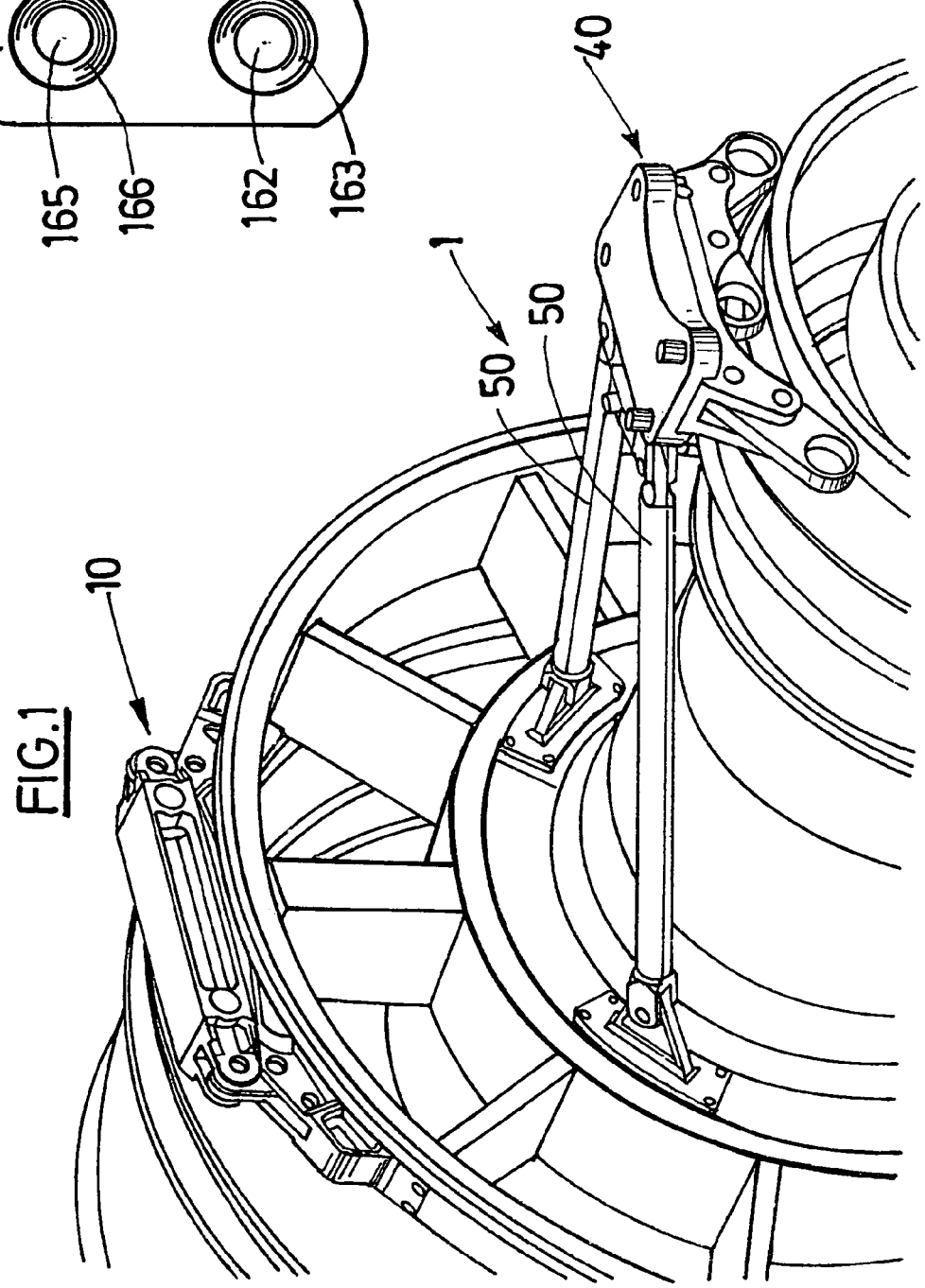
FIG. 1 represents an overview of the assembly of an engine to an aircraft pylon.

FIG. 1 represents a rear three-quarter view of a turbo reactor 1 fitted with its attachment means to an aircraft pylon which is not represented. According to this suspension mode, now quite widespread, the engine includes an attachment device 10 at the front of the engine, fixed to the outer casing of the fan. It also includes an attachment means 40 at the rear, fixed to the exhaust casing of the primary flux. The thrust transmission is ensured by two connecting rods 50 attached by an end to the base of the fan and by another end to the rear attachment 40.

Figure 5:
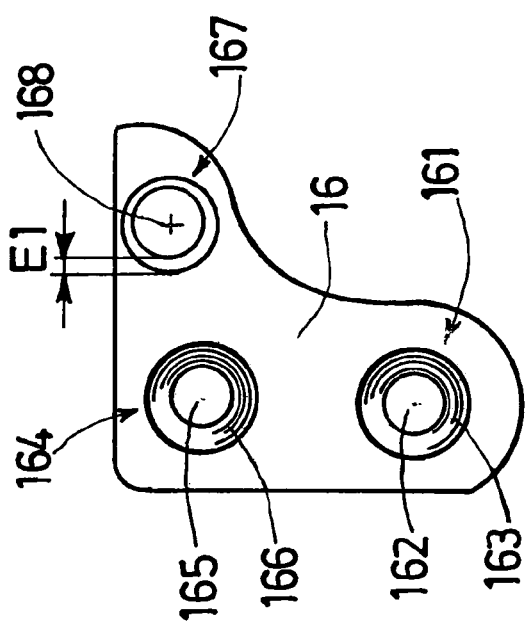
FIG. 5 shows a front view of a connecting rod with the different ball joint connections.
Figure 2:
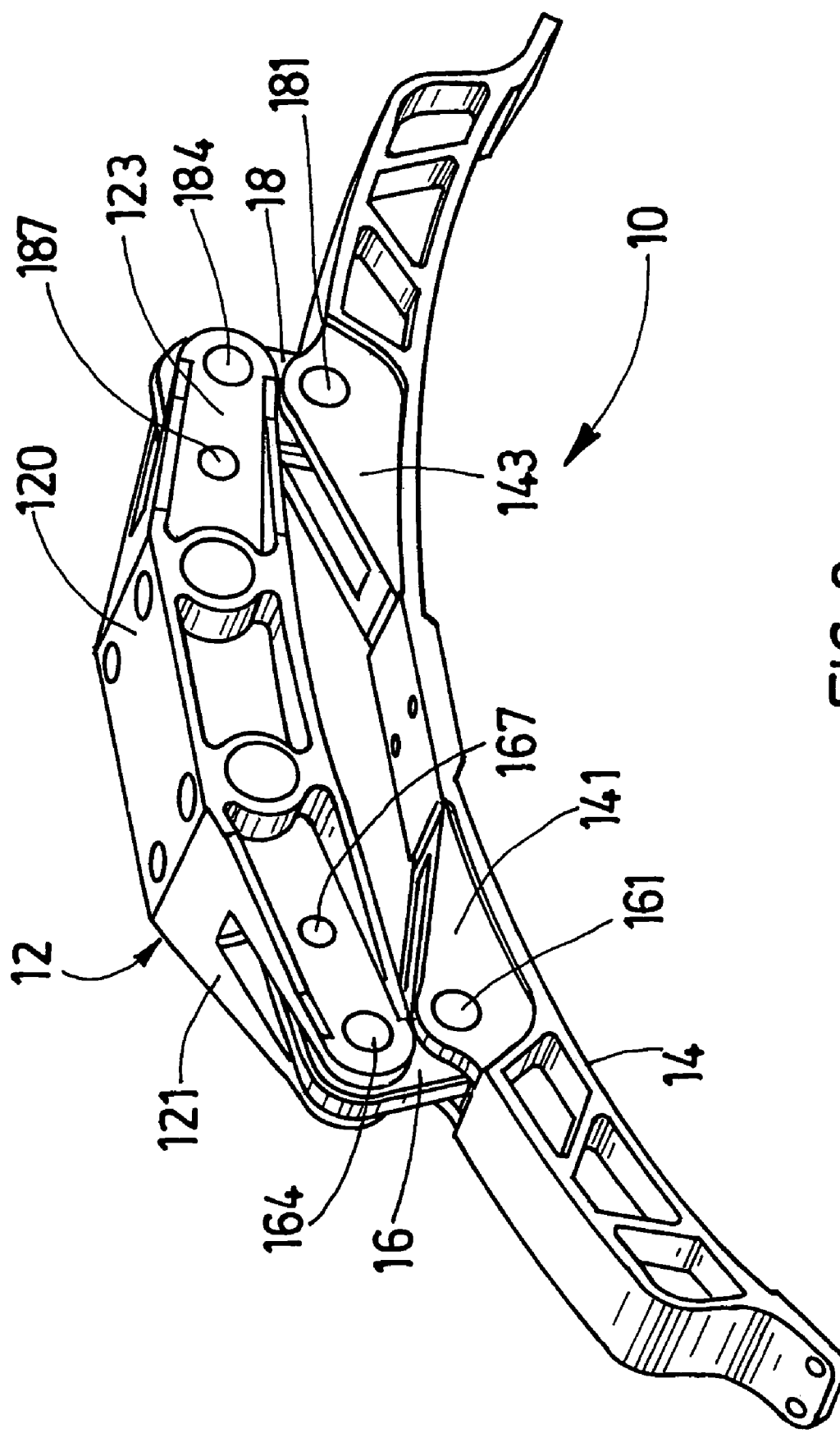
FIG. 2 represents in perspective the engine assembly device according to the invention.
Figure 3:
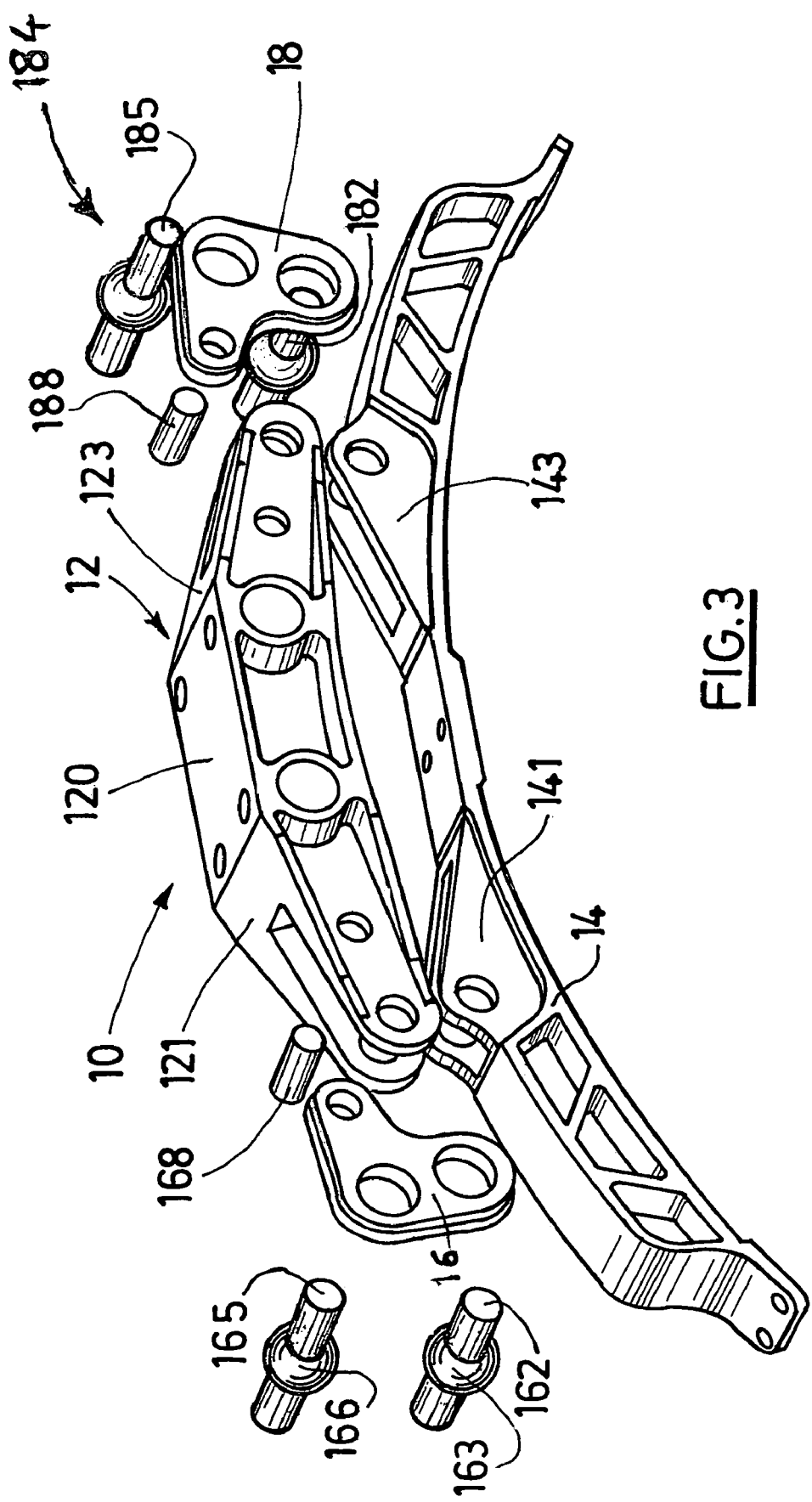
FIG. 3 represents the device of FIG. 2 as an exploded view.

This invention relates the front attachment 10 described hereunder in relation to FIGS. 2, 3 and 5. The attachment 10 is composed of an upper brace 12, of a lower brace 14 and of two ball joint connecting rods 16 and 18 linking the lower brace to the upper brace.

The upper brace is formed of a beam 120 with, here, four housings for letting through bolts wherewith the brace is made integral rigidly with the pylon of the aircraft. The beam is extended on both sides, in the transversal direction with respect to the axis of the engine, by two double yokes, 121 and 123 respectively.

The lower brace 14 whereof the shape is adapted to be welded or riveted to the fan casing, in the peripheral direction, includes two yokes 141 and 143 facing the yokes of the upper brace.

Both braces are connected together by both connecting rods 16 and 18 using links forming ball joints, as can be seen in the exploded view of FIG. 3.

The connecting rod 16 for example is connected to the yoke 141 via a first link 161, preferably a ball joint connection, with a pin 162. The ball joint connections are well-known in the field. For example, it includes a pin 162, mounted in a socket 163 with spherical outer surface, itself held in a housing of the connecting rod. The pin 162 is rotatably mounted in the corresponding housings provided in the lugs of the yoke 141.

The ball joint connection enables rotation simultaneously round the pin 162 and round both directions which are perpendicular thereto. It has the particularity of transmitting only the traction and compression loads via the pin 162.

The connecting rod 16 is connected to the yoke 121, via a second link, also preferably a ball joint connection 164, which, like the former, includes a pin 165 and a spherical socket 166. The pin 165 is rotatably mounted in housings provided in the yoke 121.

According to the invention, the connecting rod 16 is connected to the yoke 121 via a third link 167 which is in stand-by. By this expression is meant a connection which in normal operation remains inactive; it does not transmit any loads. It becomes active and transmits loads in case of breakage of set parts of the attachment. As can be seen more precisely on FIG. 5, there is provided such a link, for instance, by dint of a pin 168 going through the connecting rod 16 and the yoke 121. The pin 168 is mounted with a radial backlash E1 in a housing on the connecting rod 16.

As can be seen on FIG. 3 or on FIG. 5, the connecting rod 16 is not rectilinear; it has a shape which looks like that of a boomerang. The three linking means are not aligned.

The connecting rod 18 comprises, like the connecting rod 16, a first ball joint connection 181 and a pin 182 with a yoke 143. It is linked by a second ball joint connection 184 and pin 185 to the yoke 123. It also comprises a stand-by connection 187 with the yoke 123. This link is preferably provided as in the yoke 121, by dint of a pin 188 mounted with a set radial backlash E2 in housings aligned on the yoke and the connecting rod.

Advantageously, the backlashes E1 and E2 are identical. Moreover, by reason of the symmetry of the structure and of the means forming the attachment, both connecting rods are preferably interchangeable.

The operating mode of the device which has just been described is explained hereunder.

Under normal operation, the loads situated on the plane perpendicular to the axis of the engine, i.e. the loads having a vertical and/or lateral component, are transmitted from the engine to the pylon via the lower brace, the first and second linking means and the upper brace. Both stand-by links are inactive.

In case when the connecting rod 16 for instance breaks, there is a toggle between both braces around the connecting rod 18 until the radial backlash of the third connection 187 has disappeared. This displacement also occurs in case of failure of another part situated in the path of the loads going through the connecting rod 16, such as the beam of the upper brace, a lug of the yoke 141 or a ball joint connection.

The connection between both braces then becomes rigid. This connection ensures transmission both of the vertical and/or lateral loads.

Figure 4:
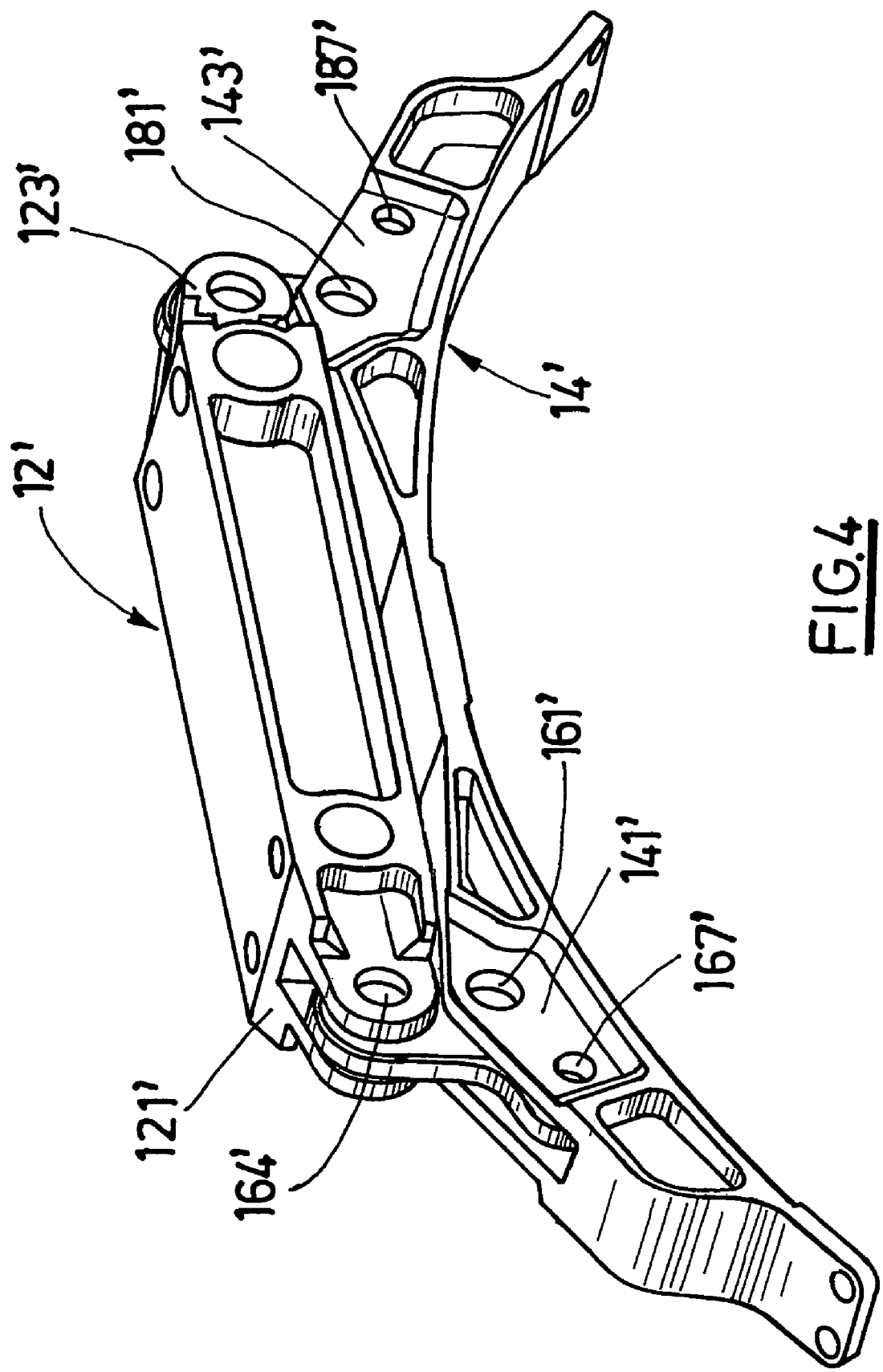
FIG. 4 represents a second embodiment of the invention in perspective view.

FIG. 4 represents a second embodiment. It differs from the first embodiment by the reversal of the third connections. The same references for the corresponding means are added the prime sign '. Both braces 12' and 14' are modified so that the third connections 167' and 187' with their respective pins 168' and 188' are provided on the lower brace 14'. The yokes 141' and 143' include therefore housings for the first connections 161' and 181', as well as for the third connections. The yokes 121' and 123' are laid out to receive the second connections. The connecting rods connecting the yokes of the upper brace to the lower brace have the same shape as in the first embodiment. They are simply reversed. By placing the third connections on the engine, it is possible to reduce the size of the yokes 121' and 123', to make the structure of the attachment device more compact and to reduce its space requirements.

The invention claimed is:

1. A device for attaching a turbo engine to an aircraft pylon including an upper brace fitted with rigid fastening means to the pylon, first and second connecting rods, each connected to the engine, via a first ball joint connection at a first portion thereof and to the upper brace via a second ball joint connection at a second portion thereof, wherein each connecting rod includes a stand-by link, and the first and second connecting rods are interchangeable with each other;
   wherein each stand-by link comprises connections with a pivot pin mounted with a backlash in a housing and both backlashes are identical.

2. The device according to claim 1, wherein each of the stand-by links connects the corresponding connecting rod to the upper brace.

3. The device according to claim 1, wherein each of the stand-by links connects the corresponding connecting rod to the engine.

4. The device according to claim 1, wherein the first and second connecting rods are identical.

5. The device according to claim 1, wherein the connecting rods are curved in shape and the stand-by link and the portions of the connecting rods corresponding to the first and second ball joint connections form an angle with respect to one another.

6. An assembly system with a front attachment, a rear attachment and connecting thrust rods, the front attachment comprising the device according to claim 1.

7. The device according to claim 1, wherein, for each of said first and second connecting rods, said pin is mounted in said housing with said backlash defining a substantial clearance around an entire periphery of said pin.

8. The device according to claim 1, wherein, for each of said first and second connecting rods, said housing, in which said pin is mounted in said stand-by link, is circular.

9. The device according to claim 1, wherein, for each of said first and second connecting rods, said first and second ball joint connections and said stand-by link are not aligned.

10. The device according to claim 9, wherein each of said first and second connecting rods has a shape of a boomerang.

11. The device according to claim 10, wherein, for each of said first and second connecting rods, said stand-by link is not between said first ball joint connection and said second ball joint connection.

12. The device according to claim 1, wherein each of said first and second connecting rods has a shape of a boomerang.

13. The device according to claim 1, wherein, for each of said first and second connecting rods, said stand-by link is not between said first ball joint connection and said second ball joint connection.

14. The device according to claim 1, wherein each of said stand-by links remains inactive and does not transmit any loads during normal operation of said device, and becomes active and transmits loads in case of breakage of parts of the device.

\* \* \* \* \*